United States Patent [19]

Jones

[11] 4,071,136

[45] Jan. 31, 1978

[54] CABLE CONTROL APPARATUS

[75] Inventor: Robert D. Jones, Oskaloosa, Iowa

[73] Assignee: Intraco, Inc., Oskaloosa, Iowa

[21] Appl. No.: 651,450

[22] Filed: Jan. 22, 1976

[51] Int. Cl.² .............................................. B65G 19/00
[52] U.S. Cl. .................................... 198/735; 198/813; 198/856
[58] Field of Search ............... 198/130, 168, 171, 203, 198/208, 834, 813, 733–735, 643, 856; 74/242.8; 226/43, 44

[56] References Cited

U.S. PATENT DOCUMENTS

| 2,230,745 | 2/1941 | Eiselstein | 198/856 |
| 2,438,068 | 3/1948 | Mercier | 198/208 |
| 2,547,039 | 4/1951 | Pechy | 226/43 |
| 2,556,182 | 6/1951 | Hapman | 198/168 |
| 2,607,468 | 8/1952 | Hall | 198/168 |
| 3,536,185 | 10/1970 | Beck | 198/208 |
| 3,831,751 | 8/1974 | Pirovano | 198/203 |
| 3,905,473 | 9/1975 | Jones et al. | 198/208 |

Primary Examiner—Evon C. Blunk
Assistant Examiner—Joseph E. Valenza
Attorney, Agent, or Firm—Henderson, Strom & Sturm

[57] ABSTRACT

A drive apparatus for a cable conveyor system having a channel formed adjacent to a drive wheel for receiving a partial loop of excess cable for the purpose of preventing the cable from becoming too tight or too loose for the proper functioning of the system. A switch assembly is positioned adjacent to one end of the channel for sensing an enlarged partial loop of cable and shutting off the power to the drive apparatus in response to such condition.

16 Claims, 17 Drawing Figures

U.S. Patent  Jan. 31, 1978  Sheet 1 of 2  4,071,136
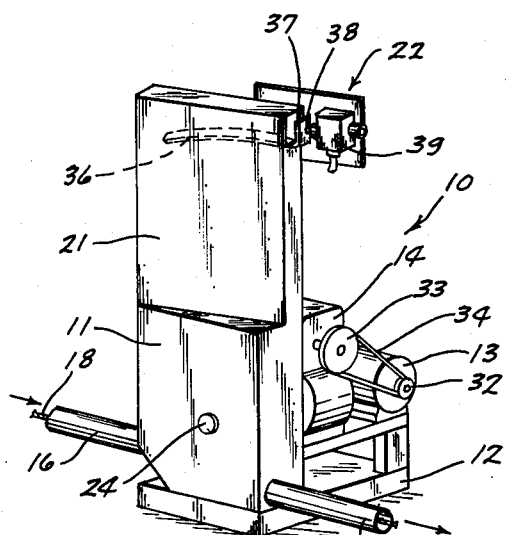
Fig. 1
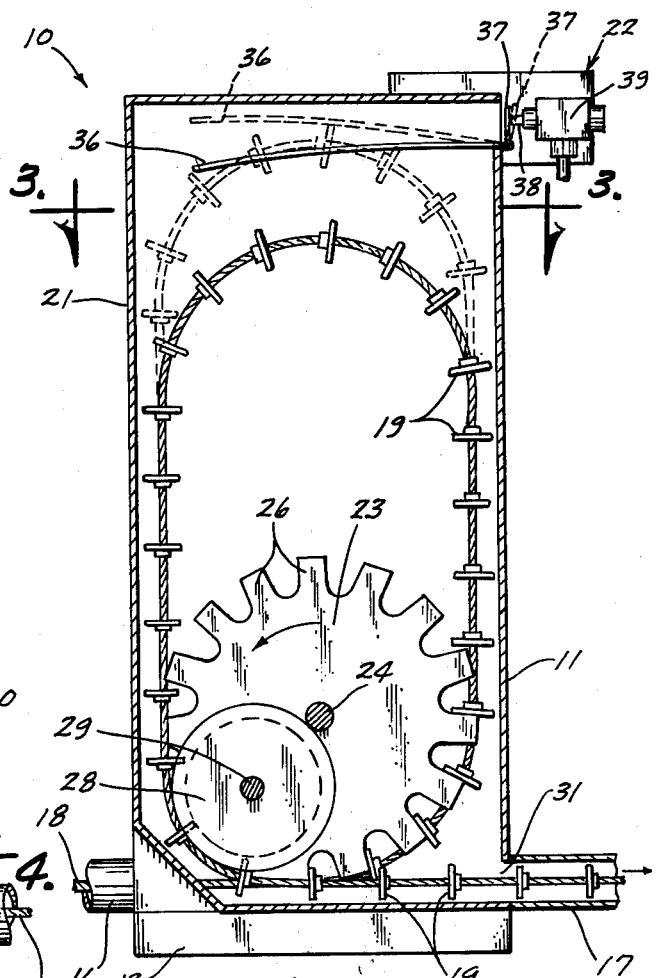
Fig. 2
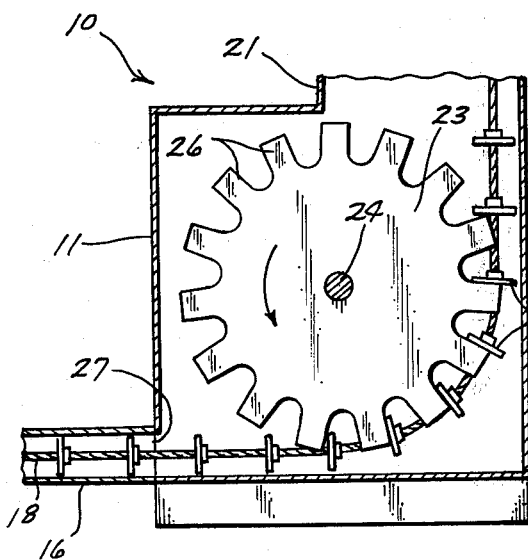
Fig. 3
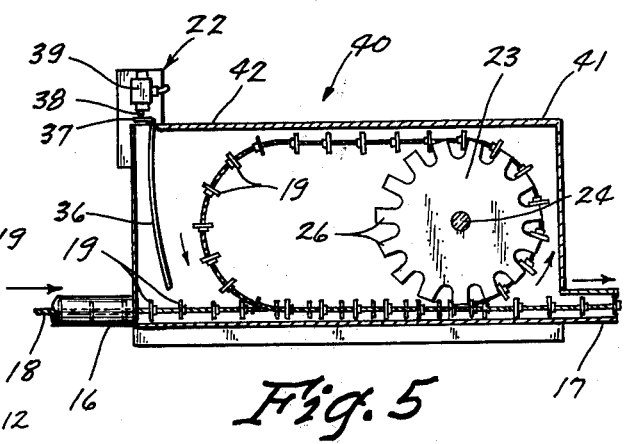
Fig. 4
Fig. 5

CABLE CONTROL APPARATUS

BACKGROUND OF THE INVENTION

The present invention relates generally to a closed material handling transport system having a cable with disc-like members rigidly affixed thereto and disposed inside of a tube. Movement of the cable through the tube moves the material to be handled through the tube since the material is trapped between the discs and the tube. The present invention relates more particularly to a drive apparatus for adjusting for varying lengths of cable for such a closed conveying system.

One of the most critical problems in a material handling system of the general type referred to above is the one of keeping the proper amount of tension upon the cable, since if the cable is too tight or too loose, it can cause a malfunction of the system or possibly damage the equipment. One of the methods used for making this required adjustment in the past has been to lengthen or shorten the tube containing the cable to thereby adjust the tension on the cable. This has been done by putting in a proper length of tubing to lengthen the tube or taking out the proper length of tubing to shorten the tube. In doing this, either the cable must be taken apart, since it is a continuous cable, or an insert tube must be used which has an opening in the side thereof which allows the cable to be placed therein and which then allows for a closing of the insert tube side opening.

Another highly effective mechanism for providing this needed adjustment without the problems discussed above with respect to lengthening or shortening the conveyor tube to achieve the proper tension, is shown in U.S. Pat. No. 3,905,473. While the device shown in U.S. Pat. No. 3,905,473 is almost completely trouble-free and fool-proof, still there is a significant amount of expense in the construction thereof as compared to the invention described below.

SUMMARY OF THE INVENTION

The present invention relates to a drive apparatus for a cable conveyor system including a housing having openings therein for allowing a cable having inserts rigidly affixed thereto to enter and exit the housing. A drive wheel rotatably attached to the interior of the housing has the cable disposed around one side thereof so as to cause the cable to be pulled through the tube circuit of a conveyor system. A channel housing is attached to the main drive apparatus housing for receiving a partial loop of excess cable and for guiding such excess cable so that it does not become twisted or tangled. The channel housing is used to replace previous cable tensioning devices which are much more expensive and complicated to construct. The channel housing of the present invention provides a space for excess cable when the continuous cable is too long for the tubular circuit in which it is disposed and furthermore provides extra cable should a slight amount of extra cable be needed, for example in such situations where the cable might contract slightly due to temperatures being colder than the temperature of the cable during the initial installation thereof.

The present invention then does indeed prevent the cable from becoming too tight, a condition which would cause undue wear and possibly breakage of the conveyor equipment. The present invention also keeps excess cable from entering those parts of the system which cannot accommodate such extra cable, thereby also preventing a condition which can cause excess wear or malfunctioning of the conveyor system. Another aspect of the present invention is the provision of a shut-off switch mechanism for sensing a condition whereby the partial loop of excess cable has become too large and therefore shuts off the drive apparatus, and thereby the system so that the continuous cable can be shortened to a managable length.

An object of the present invention is to provide a device for automatically regulating the amount of cable used in a cable conveying system.

Another object of the invention is to provide a drive apparatus for taking up excess cable in a cable conveying system.

A further object of the invention is to provide a device for shutting down a cable conveying system if the cable becomes too long or is broken.

Still another object of the present invention is to provide a drive apparatus and tension adjusting mechanism for a cable conveyor which is more economical to manufacture and is more trouble-free in its performance than prior art devices.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the drive apparatus of the present invention;

FIG. 2 is a cross-sectional view of the drive apparatus shown in FIG. 1;

FIG. 3 is a partial cross-sectional view taken along line 3—3 of FIG. 2;

FIG. 4 is a partial cross-sectional view taken along line 4—4 of FIG. 3;

FIG. 5 is a cross-sectional view of an alternate embodiment of the present invention;

DESCRIPTION OF THE PREFERRED EMBODIMENTS

Figure 6:
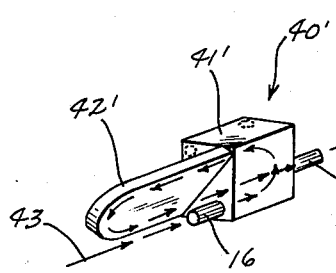
FIGS. 6, 7 and 8 are schematic perspective views showing various positions in which the embodiment of FIG. 5 could be installed in a cable conveying system.

Referring now to the drawings wherein like reference numerals designate identical or corresponding parts throughout the several views, FIG. 1 shows a perspective view of an embodiment 10 constructed in accordance with the present invention. A drive apparatus housing 11 is mounted on a platform 12, which also has mounted thereto an electric motor 13 and a gear transfer mechanism 14. Connected to the lower portion of the housing 11 is an inlet tube 16 and an outlet tube 17, which tubes form a portion of an enclosed circuit through which a continuous cable 18 is disposed and moves.

The cable 18 has a plurality of plastic disc members 19 rigidly attached thereto for the purpose of causing powdery or granular materials such as animal or poultry feeds to move through the tube circuit when the cable is caused to be moved therein.

A channel housing 21 is connected to the drive apparatus housing 11 as can clearly be seen in FIGS. 1–3 and as will be explained in detail below. A shut-off switch assembly 22 is connected to the top of the channel housing 21 as is shown in FIGS. 1 and 2.

Referring now to FIG. 2, it can be seen that a drive wheel 23 is rotatably attached to the housing 11 by means of a shaft 24. This drive wheel 23 is virtually identical in structure and purpose to the drive wheel shown in U.S. Pat. No. 3,905,473, referred to above. The drive wheel 23 has a plurality of notched projections 26 thereon which serve to guide the cable 18 and pull it through the conveyor system by the contact of the projections 26 with the disc members 19 as is shown in FIG. 2. The cable 18 enters the housing through the entry tube 16 and opening 27 (FIG. 4) and then passes around one side of the drive wheel 23 and into a partial loop above the drive wheel 23 (FIG. 2). The cable 18 then passes down and around an idler pulley 28 which is freely and rotatably mounted to the housing 11 by a shaft 29 (FIG. 2). The cable 18 then passes out of the exit tube 17 and through an opening 31 in the housing 11.

In operation, it is noted that the electric motor 13 turns a pulley 32 attached thereto which turns a pulley 23 on the gear transfer device 14, since the pulleys 32 and 33 have a drive belt 34 connecting them together. Consequently, this rotary motion from the motor 13 is transmitted to the gear transfer device 14, which serves to ultimately turn the shaft 24 of the drive wheel 23 at the proper speed. It is noted that the gear transfer device 14 actually changes the direction of the rotary motion of the motor 13 by 90° as well as changing the speed of rotation of the shaft 24 as compared to the armature of the motor 13. It is to be understood that this is merely a convenient way of achieving the proper rotation of the shaft 24 and that any other means to rotate the shaft 24 and thereby the drive wheel 23 is fully equivalent to this structure.

When it is desired to move material through the system, the motor 13 is activated to thereby turn the drive wheel 23 to cause the drive wheel 23 to pull the cable 18 through the tubular circuit. Ordinarily a slight partial loop similar to that shown in FIG. 2 is present and is disposed in the channel housing 21. This makes it very convenient for those installing such a system because it is not necessary to have the cable spliced to the exact length required. Furthermore, since certain changes in the length of the cable are to be expected from time to time, this loop will allow these changes to occur without causing a malfunction in the system as might otherwise be the case. For example, if the cable in such a system was of the exact length required so that the tension was not too tight in such a system, it could easily become too tight if the temperature dropped and caused a contraction and thereby a reduction in length to the cable 18. Unless some means is provided for compensating for such a change in length, malfunctioning of the mechanism could be expected upon the occurrence of such a temperature drop and possible damage to the apparatus could occur. If such a system without a tensioning mechanism thereon was used in which the cable 18 became too long, there also could easily be a malfunction and a high degree of wear since there would be no place for the excess cable to go. Accordingly, the channel housing 21 serves to allow for a certain amount of change in the effective length of the cable 18 so long as it is within managable limits.

Because of the inherent stiffness of a cable, it has been found that many of the complicated and expensive tensioning mechanisms used in the past for this type of equipment can be eliminated if this loop or partial loop is merely confined so that it cannot be tangled. The channel 21 is preferably constructed to be fairly narrow and preferably not more than one and one-half times the diameter of the circular plastic discs 19. Consequently, when the continuous cable 18 becomes slightly longer through stretching or for any other reason, the loop would merely extend upwardly farther as seen in FIG. 2 and there would be no further effect on the system unless such increase in the length of the loop was so great that the loop reached the point shown in dashed lines in FIG. 2. This increased length within the channel housing 21 would also occur if the cable becomes broken. Once the loop within the channel housing 21 reaches the point shown in dashed lines in FIG. 2, a lever 36 is pivoted from the point shown in solid lines to the point shown in dashed lines in FIG. 2, thereby causing a right angular portion 37 of the lever 36 to push a button 38 on a switch 39 of the switch assembly 22. When this button 38 is depressed, it turns off the power to the motor 13, thereby shutting down the entire system completely by preventing any rotation of the drive wheel 23. After this has occurred, an operator can examine the system and determine the exact problem. If the cable 18 has been broken, it can then again be spliced and the partial loop within the channel housing 21 can be set at a point where it can adjust for tightening or lengthening of the cable 18. Similarly, if the cable 18 has merely become too long through stretching or for any other reason, a portion of the cable can be removed and the cable then spliced together again as is shown in U.S. Pat. No. 3,920,340, for example. Preferably at least one side of the channel housing 21 is formed of a transparent material so as to visually indicate the position of the partial loop of the cable 18 therein. It can therefore be seen that the present invention does indeed eliminate many of the complicated tensioning mechanisms previously believed to be necessary for this type of device.

Now referring to FIG. 5, another embodiment 40 of the present invention is shown. This embodiment 40 is substantially like the embodiment 10 of FIGS. 1–4 except that there is no idler pulley such as the idler pulley 28 of the embodiment 10. This idler pulley 28 of the embodiment of FIGS. 1–4 is merely used to change the direction of the cable 18 as it exits the housing 11; and, as can be seen in the FIG. 5 embodiment, is not absolutely necessary to the invention in its broadest sense. The embodiment of FIG. 5 shows a drive housing 41 with a channel housing 42 attached to the top thereof. These housings 41 and 42 are virtually identical to the housings 11 and 21 respectively of the embodiment 10 of FIGS. 1–4. These housings 41 and 42 are, however, oriented differently from the housing as shown in FIG. 1, although the FIG. 5 embodiment could be oriented in any manner desired. The drive apparatus 40 of FIG. 5 has an entry tube 16 on one side thereof and an exit tube 17 on the other side thereof, with the cable 18 entering the entry tube 16 and passing into the housing 41 and around one side of the drive wheel 23. The cable then forms a partial loop within the channel housing 42 and exits the housing 41 through the exit tube 17. If it were desired to exit the housing 41 in a direction different than that shown in FIG. 5, an idler pulley could be installed to turn the direction of the cable 18 in the proper way so as to exit the housing 41 at whatever point and in whatever direction is desired.

Figure 7:
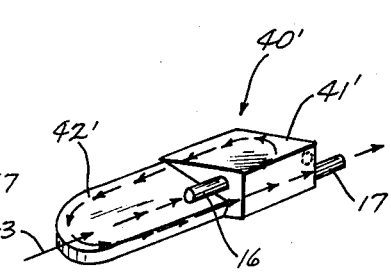
Figure 8:
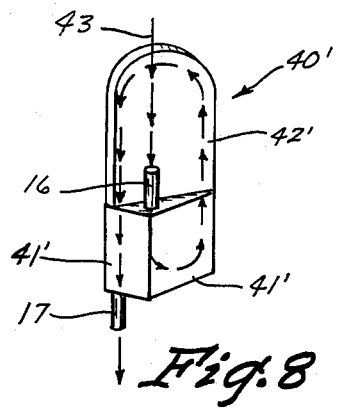

Referring now to FIGS. 6, 7 and 8, it can be seen that a drive apparatus 40' is shown in three different positions to show the versatile nature of the present invention. In FIG. 6 it is shown how the cable follows the direction of the arrows 43 and enters the entry tube 16 goes around the drive wheel 23 (not shown) within the housing 41' and then forms a partial loop within the channel housing 42' before exiting out the exit tube 17. FIGS. 7 and 8 are identical to the structure shown in FIG. 6, but show various alternatives as to the installation within the tubular circuit referred to above. FIGS. 6, 7 and 8 are of course almost identical to the embodiment shown in FIG. 5 with only a slight variation to show it schematically.

Figure 9:
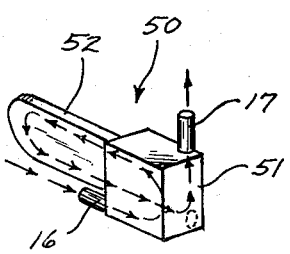
FIGS. 9, 10 and 11 show a third embodiment of the present invention shown only schematically, but showing three positions in which this embodiment could be installed in a cable conveying system.
Figure 10:
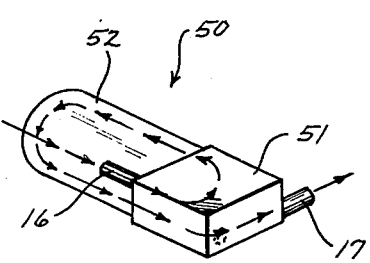
Figure 11:
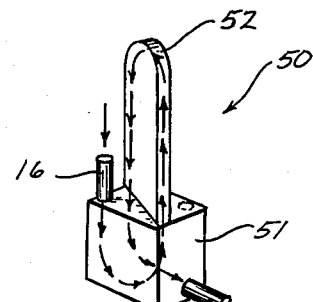

Referring now to FIG. 9, still another embodiment of the present invention is shown which can be installed on the corner of a tubular conveyor circuit whereby the direction of the cable is turned 90° from its entry to its exit form a drive apparatus 50. Although the orientation of such drive apparatus 50 in FIGS. 9, 10 and 11 are somewhat different, still the cable follows the path of the arrows and enters the entry tube 16, passes around a drive wheel 23 within the housing 51, and then forms a partial loop within the channel housing 52 before going around an idler pulley 28 (not shown) within the housing 51 so as to turn the corner and exit the exit tube 17.

Figure 12:
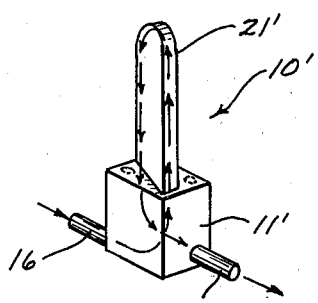
FIGS. 12, 13 and 14 show schematically an embodiment of the present invention similar to that shown in FIGS. 1-4, showing three of the possible orientations of such embodiment as it could be installed in a cable conveying system.
Figure 13:
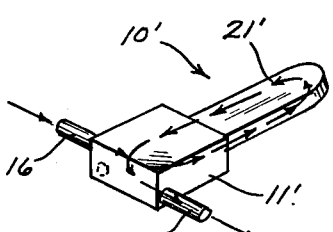
Figure 14:
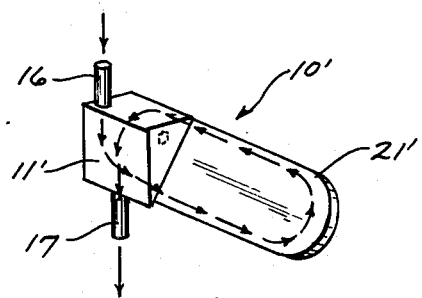

Referring now to FIGS. 12, 13 and 14, it is noted that this embodiment 10' is virtually identical to the embodiment 10 shown in FIGS. 1–4 and described above, only FIGS. 12, 13 and 14 show this drive apparatus 10' in more of a schematic fashion. It is noted again that the cable 18 will generally follow the path shown by the arrows in FIGS. 12, 13 and 14 by entering the entry tube 16, passing around a drive wheel (not shown) within the housing 11, forming a partial loop within the channel housing 21' and then passing around an idler pulley (not shown) within the housing 11' before exiting the exit port 17.

Figure 15:
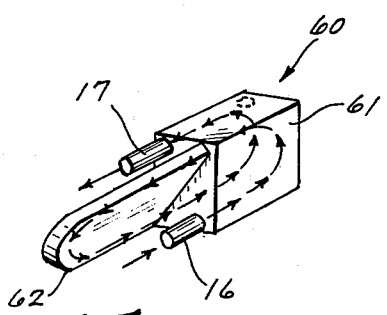
FIGS. 15, 16 and 17 show schematically a fourth embodiment of the present invention and illustrate three of the positions in which such fourth embodiment could be installed in a cable conveying system.
Figure 16:
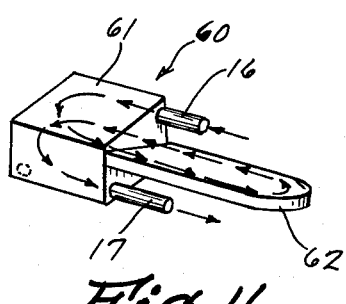
Figure 17:
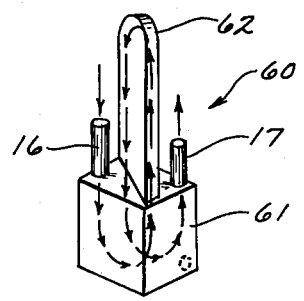

Referring now to FIGS. 15, 16 and 17, it is noted that an embodiment 60 is shown which is capable of entering and exiting in opposite directions. In this embodiment 60, the cable 18 again follows the direction of the arrows and enters the entry port 16. Then it passes into a housing 61 wherein it passes around and is driven by a drive wheel 28 (not shown) before passing up into a partial loop within the channel housing 62. After it passes into the channel housing 62, it then passes down and around an idler pulley 28 (not shown) within the housing 61 before passing out through an exit tube 17.

Accordingly, it can be seen that the present invention is very broad in its practical applications and does indeed accomplish all of the objects mentioned above. Obviously, many modifications and variations of the present invention are possible in light of the above teachings. It is therefore to be understood that, within the scope of the appended claims, the invention may be practiced otherwise than as specifically described.

I claim:

1. A drive apparatus for a cable conveyor system comprising:

a housing;
   drive wheel means rotatably attached to said housing;
   a continuous cable having a plurality of spaced members rigidly attached thereto, a portion of said cable being disposed around one side of said drive wheel means, said drive wheel means engaging said cable for pulling said cable through said cable conveyor system, said one side of the drive wheel means being defined as the portion of said drive means having said cable in contact therewith at all times; and
   channel means attached to said housing for receiving and guiding a partial loop of excess cable and for allowing movement of said partial loop due to a change in size of said partial loop from a point in which an intermediate part of said partial loop is in contact with the other side of said drive wheel means to a point in which said intermediate part is spaced a substantial distance from said drive wheel means whereby said channel means comprises the sole support for said partial loop, said partial loop of excess cable extending from the point at which said cable departs contact with said drive wheel means to a point at which said cable departs said channel means.

2. A drive apparatus as defined in claim 1 wherein said cable encounters said drive wheel means at one point and departs said drive wheel means at another point, said channel means being directly adjacent said point at which the cable departs said drive wheel means.

3. A drive apparatus as defined in claim 2 wherein said channel means comprises a channel means housing having a first and a second planar wall, said first and second planar walls being spaced apart and disposed substantially parallel with respect to each other for confining said excess cable to substantially prevent it from twisting.

4. A drive apparatus as defined in claim 3 wherein said first and second planar walls are spaced apart by a distance of no more than one and one half times the diameter of said members attached to the cable.

5. A drive apparatus as defined in claim 3 wherein said channel means further comprises a third and a fourth wall connecting said first and second walls together at the sides thereof.

6. A drive apparatus as defined in claim 5 wherein said channel means further comprises a fifth wall, said fifth wall connecting said first and second walls together at the end thereof spaced from said drive wheel means.

7. A drive apparatus as defined in claim 6 wherein said drive apparatus includes switch means attached to said channel means for sensing a condition whereby the partial loop of excess cable is adjacent said fifth wall and switching said drive apparatus off upon sensing said condition.

8. A drive apparatus as defined in claim 1 wherein said housing includes an entry opening for said cable and an exit opening for said cable, said entry and exit openings being aligned along substantially different axes.

9. A drive apparatus as defined in claim 8 wherein the axis of said entry and exit openings are substantially parallel to each other.

10. A drive apparatus as defined in claim 8 wherein said entry and exit openings are substantially normal with respect to each other.

11. A drive apparatus as defined in claim 7 wherein an idler pulley is rotatably attached to said housing, said cable being disposed around one side of said idler pulley on the departing side of said partial loop for changing the direction of exiting of the cable from said housing.

12. A drive apparatus as defined in claim 7 wherein said switch comprises:
a lever pivotally attached to said channel means housing adjacent said fifth wall, said lever extending into said channel means;
an electrical switch having a button thereon being mounted to said apparatus adjacent said lever whereby pivoting of said lever due to abutment of said partial loop causes said lever to depress said button thereby opening said switch and turning the drive apparatus off.

13. A drive apparatus as defined in claim 12 whereby one end of said lever is substantially perpendicular to the other end thereof.

14. A drive apparatus as defined in claim 1 wherein the spaced members of said partial loop include inner surfaces, outer surfaces and side surfaces, wherein at least some of said side surfaces are in contact with said channel means for guiding said partial loop.

15. A drive apparatus as defined in claim 14 wherein at least some of said outer surfaces are in contact with said channel means for guiding said partial loop.

16. A drive apparatus as defined in claim 15 wherein all of said inner surfaces do not contact said channel means.

* * * * *